(12) United States Patent
Bachmaier et al.

(10) Patent No.: US 12,521,226 B2
(45) Date of Patent: Jan. 13, 2026

(54) SURGICAL FIXATION SYSTEMS AND ASSOCIATED METHODS FOR PERFORMING TISSUE REPAIRS

(71) Applicant: ARTHREX, INC., Naples, FL (US)

(72) Inventors: Samuel Bachmaier, Mauern (DE); Dominik Steffens, Munich (DE); Raphael Hahn, Munich (DE)

(73) Assignee: ARTHREX, INC., Naples, FL (US)

( * ) Notice: Subject to any disclaimer, the term of this patent is extended or adjusted under 35 U.S.C. 154(b) by 77 days.

(21) Appl. No.: 17/287,690

(22) PCT Filed: Oct. 22, 2019

(86) PCT No.: PCT/US2019/057331
§ 371 (c)(1),
(2) Date: Apr. 22, 2021

(87) PCT Pub. No.: WO2020/092048
PCT Pub. Date: May 7, 2020

(65) Prior Publication Data
US 2021/0401567 A1    Dec. 30, 2021

Related U.S. Application Data

(60) Provisional application No. 62/754,761, filed on Nov. 2, 2018.

(51) Int. Cl.
*A61F 2/08*    (2006.01)
(52) U.S. Cl.
CPC ..... *A61F 2/0811* (2013.01); *A61F 2002/0852* (2013.01); *A61F 2002/0882* (2013.01); *A61F 2220/0075* (2013.01)

(58) Field of Classification Search
CPC ............ A61F 2/0811; A61F 2220/0075; A61F 2002/0852
See application file for complete search history.

(56) References Cited

U.S. PATENT DOCUMENTS

| 7,097,654 B1 | 8/2006 | Freedland |
| 8,628,573 B2 * | 1/2014 | Roller ................ A61B 17/0487 606/232 |
| 9,357,991 B2 | 6/2016 | Denham et al. |

(Continued)

FOREIGN PATENT DOCUMENTS

| EP | 2238944 A2 | 10/2010 |
| EP | 2455002 A1 * | 5/2012 ......... A61B 17/0401 |

(Continued)

OTHER PUBLICATIONS

International Search Report and Written Opinion of the International Searching Authority for International application No. PCT/US2019/057331 dated Jan. 20, 2020.

(Continued)

*Primary Examiner* — Jacqueline Wozniki
(74) *Attorney, Agent, or Firm* — Carlson, Gaskey & Olds, P.C.

(57) ABSTRACT

This disclosure relates to surgical fixation systems and methods. The surgical fixation systems may include one or more loops and one or more reinforcement materials. The surgical fixation systems can be used in various knotless tissue repair procedures.

14 Claims, 13 Drawing Sheets

(56) References Cited

U.S. PATENT DOCUMENTS

| | | |
|---|---|---|
| 9,924,939 B1 | 3/2018 | Anderson |
| 2011/0106153 A1 | 5/2011 | Stone et al. |
| 2012/0065732 A1* | 3/2012 | Roller ................ A61B 17/0487 |
| | | 606/232 |
| 2012/0123474 A1 | 5/2012 | Zajac et al. |
| 2013/0023928 A1* | 1/2013 | Dreyfuss .......... A61B 17/06166 |
| | | 606/228 |
| 2016/0157851 A1 | 6/2016 | Spenciner |
| 2017/0209139 A1* | 7/2017 | Burkhart ............ A61B 17/0401 |
| 2018/0021038 A1 | 1/2018 | Dolan et al. |
| 2018/0055507 A1 | 3/2018 | Bachmaier et al. |
| 2018/0199931 A1 | 7/2018 | Saliman et al. |
| 2018/0221133 A1 | 8/2018 | Lund |
| 2018/0360440 A1* | 12/2018 | Guerra ............... A61B 17/0401 |
| 2019/0008507 A1* | 1/2019 | Anderson .......... A61B 17/0487 |
| 2019/0314143 A1* | 10/2019 | Jackson ................ A61F 2/0811 |

FOREIGN PATENT DOCUMENTS

| | | | |
|---|---|---|---|
| EP | 2455040 A1 | 5/2012 | |
| EP | 2581047 A1 * | 4/2013 | ....... A61B 17/04401 |
| EP | 2883518 A1 * | 6/2015 | ............ A61B 17/04 |
| EP | 3260052 A2 | 12/2017 | |
| JP | 2012130705 | 7/2012 | |
| WO | 2017/189096 A1 | 11/2017 | |
| WO | 2018039542 A1 | 3/2018 | |
| WO | 2018169961 A1 | 9/2018 | |

OTHER PUBLICATIONS

International Preliminary Report on Patentability for International application No. PCT/US2019/057331 dated May 14, 2021.
Office Action for EP Application No. 19 801 459.9 dated Dec. 10, 2024.

* cited by examiner

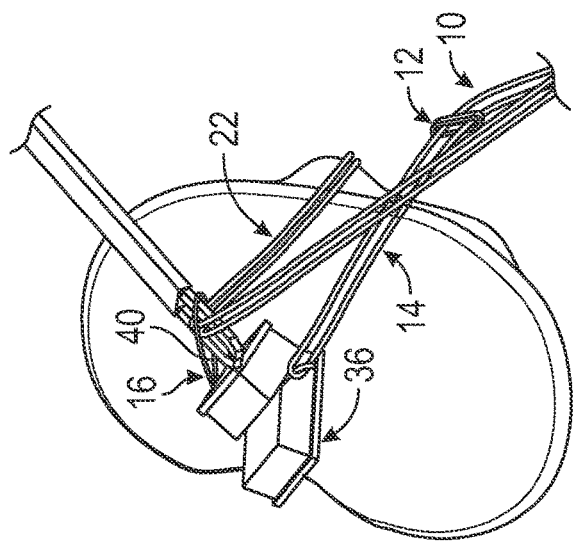
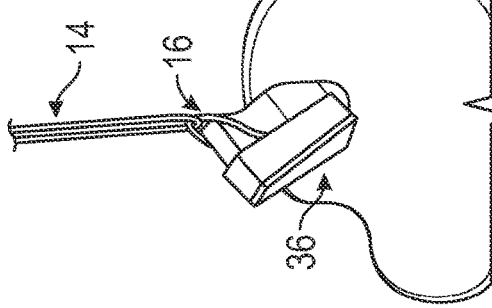
FIG. 4
FIG. 6
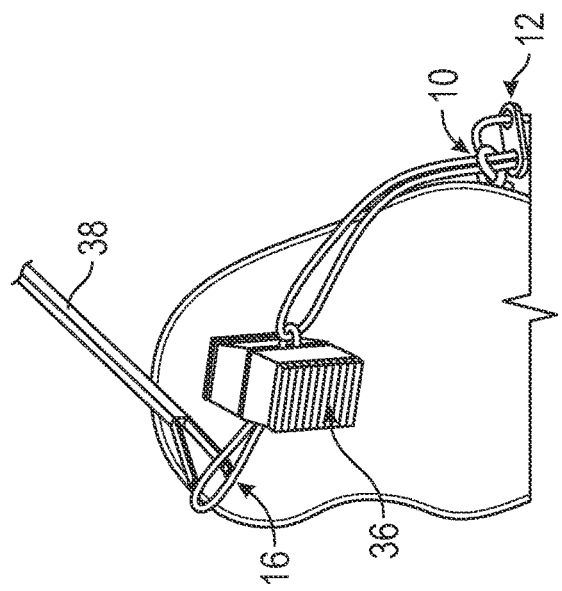
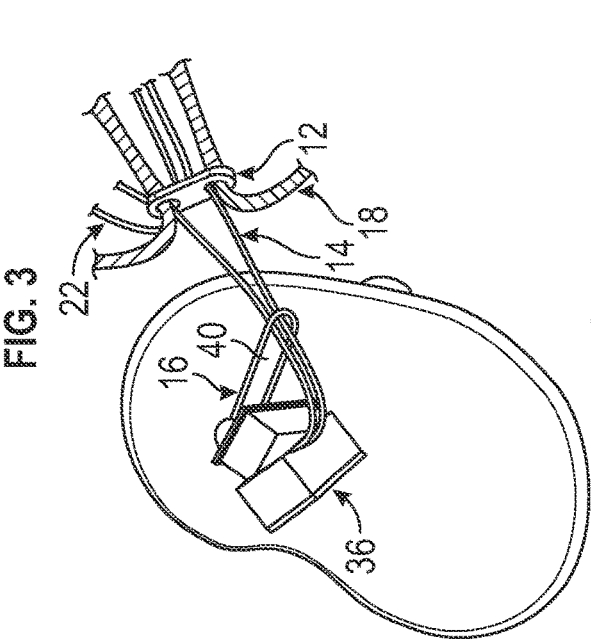
FIG. 3
FIG. 5

SURGICAL FIXATION SYSTEMS AND ASSOCIATED METHODS FOR PERFORMING TISSUE REPAIRS

CROSS REFERENCE TO RELATED APPLICATIONS

This is the national stage entry of International application No. PCT/US2019/057331, filed Oct. 22, 2019, which claims priority to U.S. Provisional Application No. 62/754,761, filed on Nov. 2, 2018, the entire disclosures of which are incorporated herein by reference.

BACKGROUND

This disclosure relates to surgical fixation systems and methods for performing knotless tissue repairs.

Tissue repairs, such as anterior cruciate ligament (ACL) repairs, posterior cruciate ligament (PCL) repairs, and meniscal repairs, for example, are common in the field of orthopedic surgery. These types of repairs typically involve capturing and fixating torn or otherwise damaged tissue using a combination of sutures and fixation devices (e.g., buttons and/or anchors) in order to restore the functionality of the native tissue.

SUMMARY

This disclosure relates to surgical fixation systems and methods. The surgical fixation systems may include one or more loops and, optionally, one or more reinforcement materials. The surgical fixation systems can be used in various knotless tissue repair procedures, including but not limited to, ACL, PCL, and meniscal repairs.

A surgical fixation system according to an exemplary aspect of this disclosure may include, inter alia, a fixation device, an adjustable loop connected to the fixation device, a continuous loop connected to the adjustable loop, and a shuttle construct connected to the continuous loop. A reinforcement material may be connected to the fixation device. The reinforcement material may be unattached to both the adjustable loop and the continuous loop. The reinforcement material may be tensioned separately from both the adjustable loop and the continuous loop.

A method for knotlessly repairing tissue according to another exemplary aspect of this disclosure may include, inter alia, passing a shuttle construct of a surgical fixation system through a native tissue of a patient. The surgical fixation system may include a fixation device, an adjustable loop connected to the fixation device, a continuous loop connected to the adjustable loop, and the shuttle construct connected to the continuous loop. The method may further include tensioning the shuttle construct to shuttle the continuous loop through the native tissue. After the tensioning, the continuous loop may be rotated to position the continuous loop around the native tissue. Rotating the continuous loop may form a rip-stop cinched loop that captures each of a first bundle and a second bundle of the native tissue.

A method for knotlessly repairing tissue according to another exemplary aspect of this disclosure may include, inter alia, passing a shuttle construct of a surgical fixation system through a single bundle of a partially torn native tissue of a patient. The surgical fixation system may include a fixation device, an adjustable loop connected to the fixation device, a continuous loop connected to the adjustable loop, the shuttle construct connected to the continuous loop, and a passing filament connected to the fixation device. The method may further include tensioning a suture tail of the shuttle construct to shuttle the continuous loop through the single bundle. After shuttling the continuous loop through the single bundle, the passing filament may be threaded through a suture pocket of the shuttle construct and then pulled to transfer the fixation device through the continuous loop. The transfer of the fixation device through the continuous loop may create a cinched loop around the single bundle of the partially torn native tissue.

BRIEF DESCRIPTION OF THE DRAWINGS

FIGS. 3, 4, 5, 6, and 7 schematically illustrate a method for performing a knotless tissue repair using the surgical fixation system of FIG. 1.

DETAILED DESCRIPTION

Figure 1:
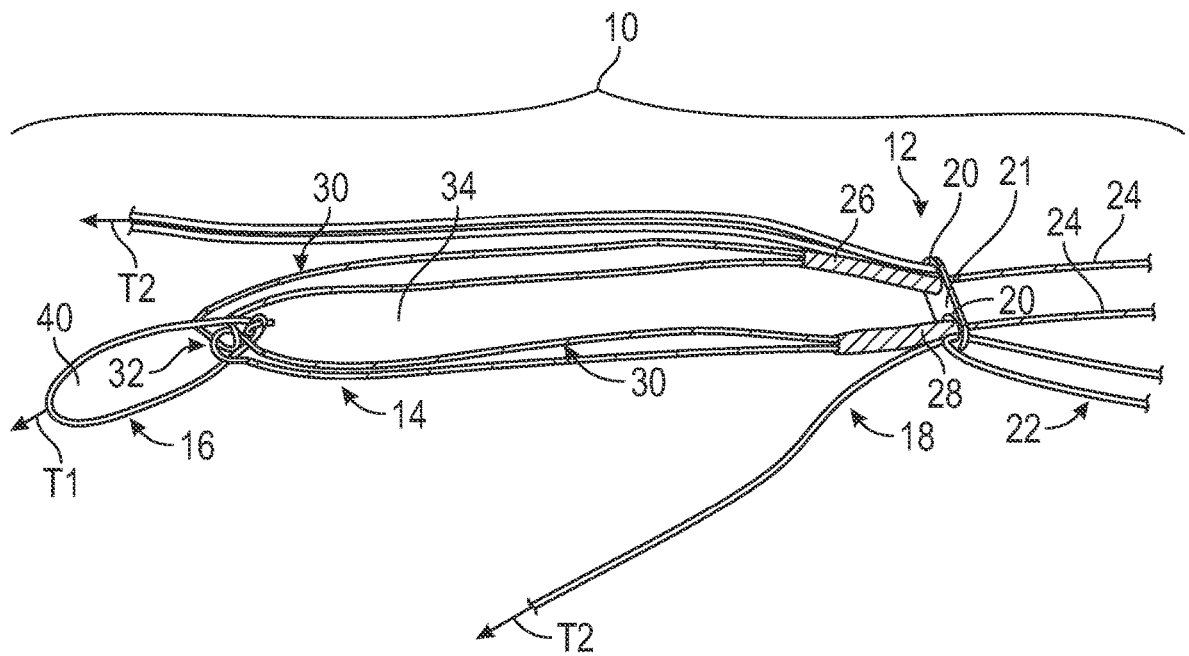
FIG. 1 illustrates a surgical fixation system for performing a knotless tissue repair method according to an embodiment of this disclosure.

This disclosure relates to surgical fixation systems and methods. The surgical fixation systems may include one or more loops and, optionally, one or more reinforcement materials. The surgical fixation systems can be used in various knotless tissue repair procedures, including but not limited to, ACL, PCL, and meniscal repairs.

A surgical fixation system according to an exemplary aspect of this disclosure may include, inter alia, a fixation device, an adjustable loop connected to the fixation device, a continuous loop connected to the adjustable loop, and a shuttle construct connected to the continuous loop. A reinforcement material may be connected to the fixation device. The reinforcement material may be unattached to both the adjustable loop and the continuous loop. The reinforcement material may be tensioned separately from both the adjustable loop and the continuous loop.

In a further embodiment, a fixation device of a surgical fixation system is a button.

In a further embodiment, an adjustable loop of a surgical fixation system may include a first adjustable eyesplice loop received through a first aperture of a fixation device and a second adjustable eyesplice loop received through a second aperture of a fixation device.

In a further embodiment, an adjustable loop of a surgical fixation system may include a first free braid strand for adjusting a first adjustable eyesplice loop and a second free braid strand for adjusting a second adjustable eyesplice loop.

In a further embodiment, a first free braid strand of an adjustable loop of a surgical fixation system extends from a first spliced section of the adjustable loop and a second free braid strand extends from a second spliced section of the adjustable loop.

In a further embodiment, a continuous loop of a surgical fixation system is a non-adjustable loop.

In a further embodiment, a portion of a continuous loop of a surgical fixation system rests over top of an interconnection between a first adjustable eyesplice loop and a second adjustable eyesplice loop of an adjustable loop.

In a further embodiment, a shuttle construct of a surgical fixation system includes a suture strand that is attached to a continuous loop.

In a further embodiment, a shuttle construct of a surgical fixation system includes a suture loop, a suture pocket formed in the suture loop, and a suture tail that extends from the suture loop.

In a further embodiment, a first portion of a suture loop of a shuttle construct of a surgical fixation system is attached to a continuous loop, and a suture tail is connected to a second portion of the suture loop that is located at an opposite end of the suture loop from the first portion.

In a further embodiment, a suture loop of a shuttle construct establishes a central opening and a suture pocket establishes an opening that is separate from the central opening.

In a further embodiment, a reinforcement material of a surgical fixation system includes a suture tape that is looped through apertures of a fixation device.

A method for knotlessly repairing tissue according to another exemplary aspect of this disclosure may include, inter alia, passing a shuttle construct of a surgical fixation system through a native tissue of a patient. The surgical fixation system may include a fixation device, an adjustable loop connected to the fixation device, a continuous loop connected to the adjustable loop, and the shuttle construct connected to the continuous loop. The method may further include tensioning the shuttle construct to shuttle the continuous loop through the native tissue. After the tensioning, the continuous loop may be rotated to position the continuous loop around the native tissue. Rotating the continuous loop may form a rip-stop cinched loop that captures each of a first bundle and a second bundle of the native tissue.

In a further embodiment, passing a shuttle construct includes passing a suture tail of the shuttle construct through a stump of a native tissue.

In a further embodiment, shuttling a continuous loop through a native tissue is performed until an adjustable loop is located proximate the native tissue.

In a further embodiment, rotating a continuous loop includes flipping the continuous loop in a backwards direction toward an entry point where the shuttle construct originally enters into a native tissue.

In a further embodiment, a shuttle construct is removed from a surgical fixation system after rotating a continuous loop around a native tissue.

In a further embodiment, a method includes forming a bone tunnel through a bone, passing a fixation device through the bone tunnel, and adjusting a size of the adjustable loop to restore the native tissue to a native position without tying any knots.

In a further embodiment, a bone is a femur and a native tissue is a completely torn native anterior cruciate ligament (ACL).

A method for knotlessly repairing tissue according to another exemplary aspect of this disclosure may include, inter alia, passing a shuttle construct of a surgical fixation system through a single bundle of a partially torn native tissue of a patient. The surgical fixation system may include a fixation device, an adjustable loop connected to the fixation device, a continuous loop connected to the adjustable loop, the shuttle construct connected to the continuous loop, and a passing filament connected to the fixation device. The method may further include tensioning a suture tail of the shuttle construct to shuttle the continuous loop through the single bundle. After shuttling the continuous loop through the single bundle, the passing filament may be threaded through a suture pocket of the shuttle construct and then pulled to transfer the fixation device through the continuous loop. The transfer of the fixation device through the continuous loop may create a cinched loop around the single bundle of the partially torn native tissue.

FIG. 1 illustrates an exemplary surgical fixation system 10. The surgical fixation system 10 may be used to perform a variety of tissue repair procedures. The tissue repair procedures could include any procedure that involves repairing torn tissue. ACL, PCL, and meniscal repairs non-limiting examples of tissue repair procedures which could benefit from the surgical fixation systems 10 of this disclosure. The surgical fixation system 10 could additionally be used in tissue repair procedures related to the ankle and shoulder.

In an embodiment, the surgical fixation system 10 is used to perform "knotless" tissue repair procedures. In this disclosure, the term "knotless" indicates that the tissue repair can be performed without the need to tie any knots in the various flexible materials or sutures that are utilized during the tissue repair procedure.

The surgical fixation system 10 may include, in this example, a fixation device 12, an adjustable loop 14, a continuous loop 16, and, optionally, a reinforcement material 18. The adjustable loop 14 may be connected to (e.g., suspended from) the fixation device 12, and the continuous loop 16 may be connected to the adjustable loop 14 and is therefore not directly connected to the fixation device 12. The reinforcement material 18 may be connected to the fixation device 12 but is unconnected to either the adjustable loop 14 or the continuous loop 16.

The fixation device 12 may provide cortical bone fixation of the surgical fixation system 10 after the surgical fixation system has been positioned within a bone tunnel. In an embodiment, the fixation device 12 is a button or an anchor. However, fixation devices having other similar configurations could also be used. The fixation device 12 may be oblong or round and may be made of either metallic or polymeric materials within the scope of this disclosure.

In another embodiment, the fixation device 12 includes one or more apertures 20 formed through the body of the fixation device 12 for receiving the adjustable loop 14 and/or the reinforcement material 18. The fixation device 12 of the embodiment of FIG. 1, for example, may include two apertures 20 for connecting the adjustable loop 14 and the reinforcement material 18 to the fixation device 12. However, the fixation device 12 could include additional apertures or openings in excess of two within the scope of this disclosure.

The apertures 20 may be configured and arranged to receive the adjustable loop 14 and the reinforcement material 18 of the surgical fixation system 10. A bridge 21 of the fixation device 12 may separate the apertures 20 from one another and provides a surface for carrying the adjustable loop 14 and the reinforcement material 18 of the surgical fixation system 10. One of apertures 20 may additionally carry one or more passing filaments 22 for passing the fixation device 12 through a bone tunnel and/or for flipping the fixation device 12 relative to bone after exiting from the bone tunnel.

The continuous loop 16 may be configured as a non-adjustable loop that is connected to a portion of the adjustable loop 14. The continuous loop 16 may be made of one or more flexible, thread-like materials, including but not limited to, suture, tape, weave, or mesh, or any combinations of these materials. In an embodiment, the continuous loop 16 is located at an opposite end of the adjustable loop 14 from the portion of the adjustable loop 14 that rests over the bridge 21 of the fixation device 12.

The continuous loop 16 may be pre-assembled to the adjustable loop 14. In this disclosure, the term "pre-assembled" is intended to denote that the continuous loop 16 is affixed to the adjustable loop 14 during the manufacturing process rather than during or just prior to the surgical procedure. Thereby, surgeons or other medical personnel are not required to physically stitch or otherwise attach the continuous loop 16 to the adjustable loop 14 upon removing the surgical fixation system 10 from its sterile packaging.

The continuous loop 16 may be attached to the adjustable loop 14 of the surgical fixation system 10 by swaging, sewing, knotting, stitching, splicing, weaving, gluing, or by any other fixation technique. In an embodiment, the continuous loop 16 is looped over the adjustable loop 14 and then its free ends are knotted together to attach the continuous loop 16 to the adjustable loop 14. Once connected to the adjustable loop 14, the continuous loop 16 is a fixed, non-adjustable loop that lacks any free ends.

The reinforcement material 18 may be an additional suture construct of the surgical fixation system 10. For example, the reinforcement material 18 could include suture tape, such as FiberTape® suture, suture tape coated with collagen, suture with biological material or a collagen coated material, a collagen patch, a biological construct such as ArthroFLEX® dermal allograft, a superelastic material such as nitinol, or any other similar construct.

The size of the fixation device 12 can be adjusted to accommodate the addition of the reinforcement material 18. The reinforcement material 18 may be passed through the apertures 20 of the fixation device 12 to connect the reinforcement material 18 to the surgical fixation system 10. The reinforcement material 18 is thus unconnected in any way to either the adjustable loop 14 or the continuous loop 16. The reinforcement material 18 may be used to augment a tissue repair procedure and generally acts as a reinforcement that supports the primary repair provided by the adjustable loop 14 and the continuous loop 16. The reinforcement material 18 may therefore be referred to as a "brace" or "safety belt" of the surgical fixation system 10. In another embodiment, the reinforcement material 18 may be utilized for providing tactile feedback of deployment (e.g., flipping) of the fixation device 12 during implantation.

In another embodiment, the adjustable loop 14 and the continuous loop 16 may be tensioned independently from the reinforcement material 18, thereby resulting in independent tension loads. This is possible because these components are connected separately to the fixation device 12 of the surgical fixation system 10. For example, a first tension T1 may be applied to the continuous loop 16 and the adjustable loop 14, whereas a second, different tension T2 may be applied to the reinforcement material 18 during implantation of the surgical fixation system 10 in order to reduce any initial gap formation and increase the load bearing capability of the surgical fixation system 10. Tension can also be reapplied to the adjustable loop 14 and the continuous loop 16 after tensioning the reinforcement material 18. Accordingly, joint loads may be shared between the loops 14, 16 and the reinforcement material 18, with the reinforcement material 18 acting as a dynamic joint stabilizer that shares loads with the loops 14, 16 according to their relative initial tensioning. The reinforcement material 18 may react to loads that exceed predefined strain thresholds of the loops 14, 16.

Figure 2:
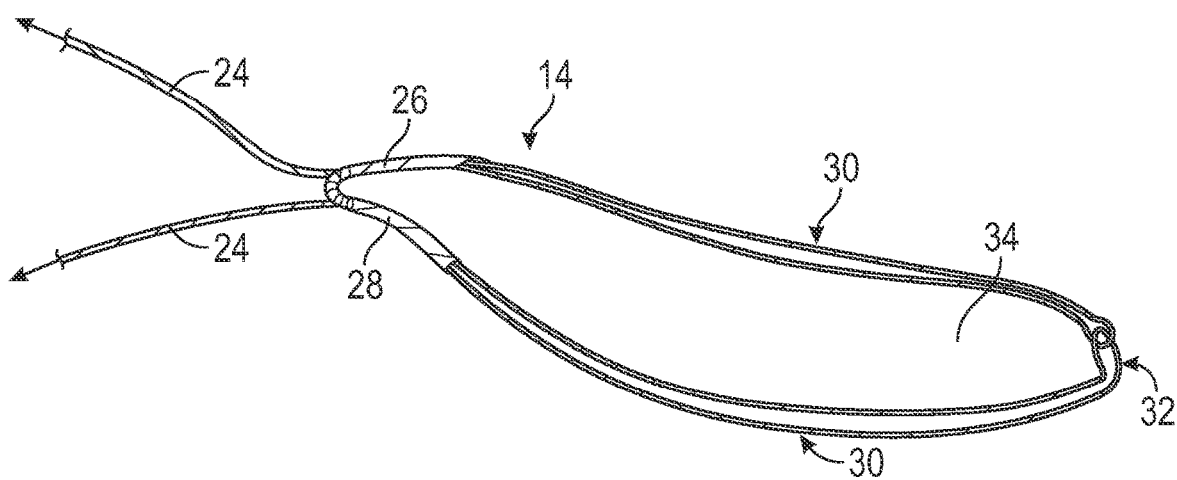
FIG. 2 illustrate an adjustable loop of the surgical fixation system of FIG. 1.

FIG. 2 illustrates additional features of the adjustable loop 14 of the surgical fixation system 10 of FIG. 1. The fixation device 12 is removed in FIG. 2 to better illustrate the configuration of the adjustable loop 14. Although a specific configuration of the adjustable loop 14 is shown in FIG. 2, other adjustable loop configurations could alternatively be utilized within the surgical fixation system 10.

In an embodiment, the adjustable loop 14 is made of a flexible material, and in this example, may include an adjustable length and/or perimeter. Free braid strands 24 of the adjustable loop 14, which may also be referred to as shortening strands, may be pulled to reduce the size of the adjustable loop 14. For example, the adjustable loop 14 may be adjusted in a first direction by pulling the free braid stands 24 but is prevented from loosening in the opposite direction due to applied internal tensile forces. In an embodiment, the free braid strands 24 extend from spliced sections 26, 28 of the adjustable loop 14. The spliced sections 26, 28 may act as locking mechanisms for preventing the unintentional loosening of the free braid strands 24.

The adjustable loop 14 may additionally include one or more adjustable eyesplice loops 30, which may be formed by splicing the flexible material that is used to form the adjustable loop 14 through itself at each of the spliced sections 26, 28. The adjustable loop 14 may be connected to the fixation device 12 prior to completely forming the adjustable loop 14. The free braid strands 24 may be pulled to constrict the size of the adjustable eyesplice loops 30 and thus may change the overall size of the adjustable loop 14.

In an embodiment, the adjustable loop 14 includes two adjustable eyesplice loops 30. The two adjustable eyesplice loops 30 may be interlinked at an interconnection 32. In an embodiment, the continuous loop 16 is connected to the adjustable loop 14 at the interconnection 32 (see FIG. 1). For example, the continuous loop 16 may be looped through a central opening 34 established by the interlinked adjustable eyesplice loops 30 such that the continuous loop 16 may rest over top of the interconnection 32 (see FIG. 1).

FIGS. 3-7, with continued reference to FIGS. 1-2, schematically illustrate an exemplary method for repairing a tissue. More particularly, FIGS. 3 through 7 illustrate, in sequential order, an exemplary embodiment for knotlessly repairing a native tissue 36 by employing the surgical fixation system 10. The native tissue 36 may include a partially or completely damaged ligament, muscle, cartilage, or any other soft tissue. The native tissue 36 is "native" in that the tissue is part of the original anatomy of the patient. In an embodiment, the native tissue 36 is a partially torn native ACL. Partial tears may occur when only a single bundle of the native ACL is torn or otherwise damaged. However, this disclosure is not limited to partial repairs or to ACL repairs. The surgical fixation system 10 could be used in a variety of tissue repairs, including partial or complete tissue repairs, within the scope of this disclosure.

Fewer or additional steps than are recited below could be performed within the scope of this disclosure. In addition, the recited order of steps shown in FIGS. 3-7 is not intended to limit this disclosure.

Referring first to FIG. 3, the continuous loop 16 of the surgical fixation system 10 may be passed through the native tissue 36. A surgical instrument 38, such as a suture passer, may be utilized to assist in passing the continuous loop 16 through the native tissue 36. In an embodiment, the surgical instrument 38 is a Knee Scorpion™ Suture Passer, which is available for purchase from Arthrex, Inc. of Naples, Florida. However, other surgical instruments could alternatively be utilized.

Next, as shown in FIG. 4, the passing filament 22 of the surgical fixation system 10 may be shuttled through a central opening 40 established by the continuous loop 16. The passing filament 22 is continued to be pulled until the fixation device 12 and the adjustable loop 14 both pass through the central opening 40 (see FIG. 5). The passing filament 22 may then be further tensioned in order to constrict the continuous loop 16 (e.g., form a cinched loop) around the native tissue 36 (see FIG. 6).

Figure 7:
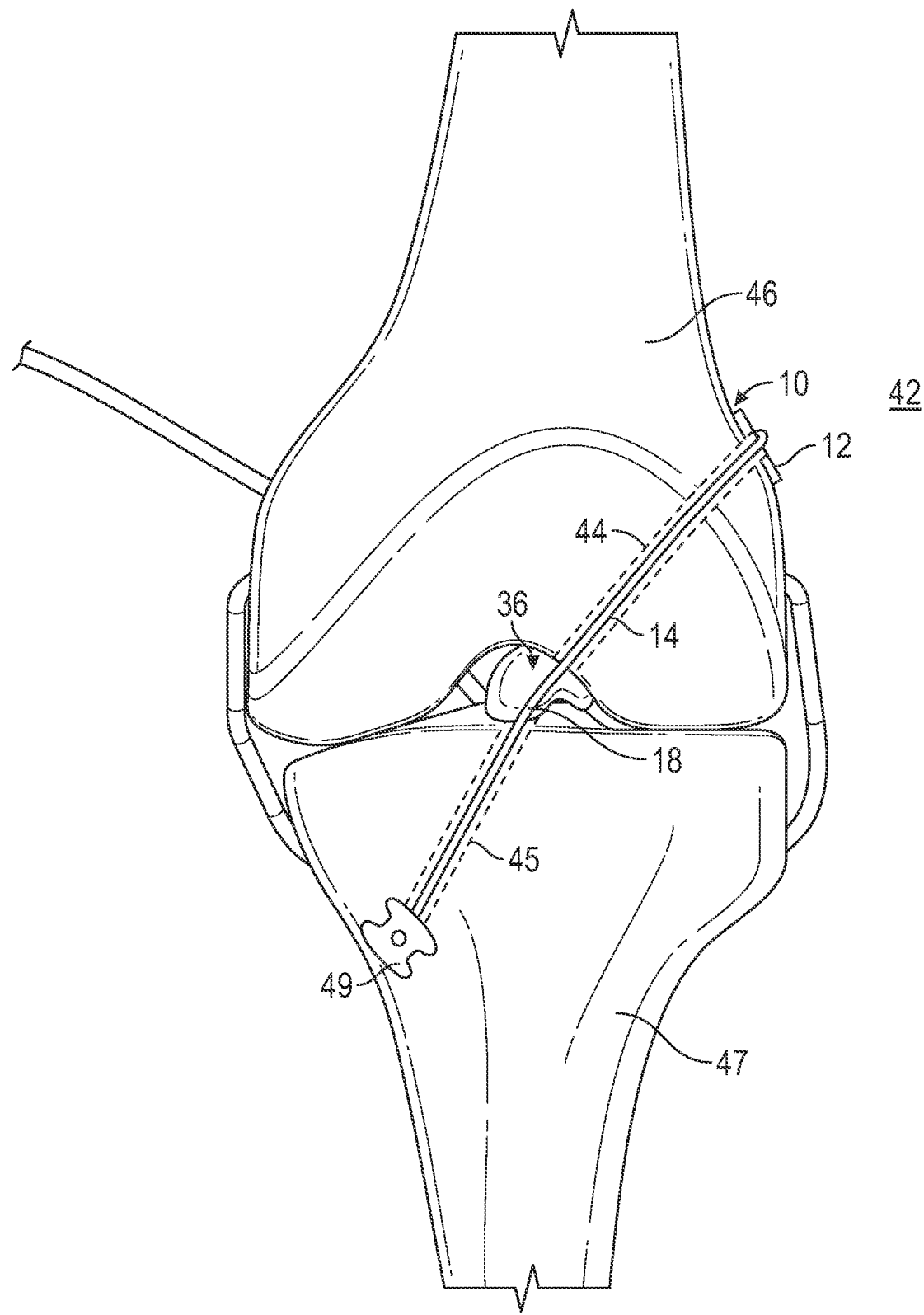

The surgical fixation system 10 may then be used to complete the knotless tissue repair. FIG. 7 illustrates a final tissue repair 42 that is established by using the surgical fixation system 10. As shown, a bone tunnel 44 (e.g., a socket) may be formed in a bone 46 (e.g., a femur). The bone tunnel 44 may be formed using known drilling techniques to establish a void within the bone for receiving and accommodating the surgical fixation system 10. The fixation device 12 may be passed through the bone tunnel 44 using the passing filament 22 and may self-flip onto the cortex of the bone 46 once tension is released on the passing filament 22. After passing and flipping the fixation device 12, the adjustable loop 14 is positioned within the bone tunnel 44. The free braid strands 24 may be pulled to adjust the size of the adjustable loop 14 and to aid the positioning of the adjustable loop 14 within the bone tunnel 44, thereby restoring the native tissue 36 to its native location and functionality.

The reinforcement material 18 of the surgical fixation system 10 can be utilized throughout the repair to optimize tension and to stabilize the construct. In an embodiment, the reinforcement material 18 may be passed through a second bone tunnel 45 of a second bone 47 (e.g., a tibia) and may then be fixated relative to the second bone 47 using a second fixation device 49 (e.g., a button or anchor).

Figure 8:
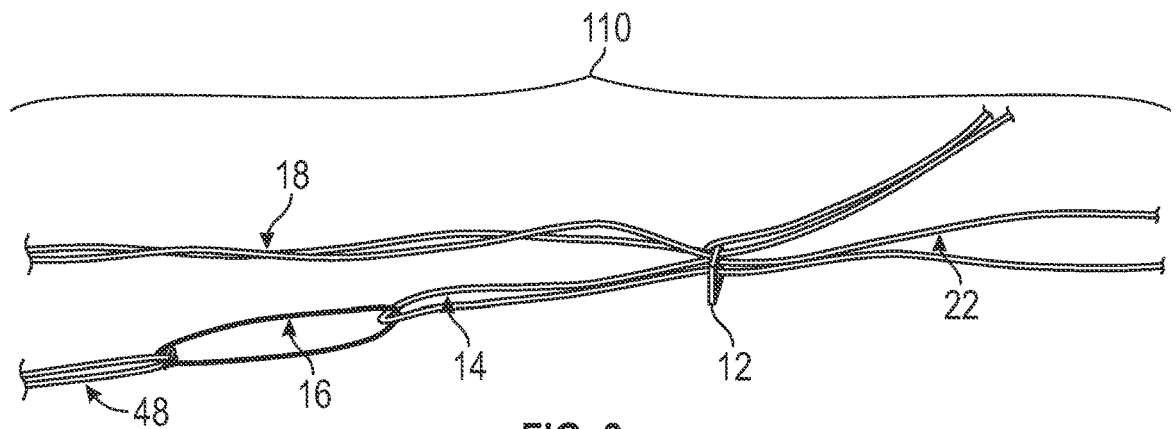
FIG. 8 illustrates a surgical fixation system for performing a knotless tissue repair method according to another embodiment of this disclosure.

FIG. 8 illustrates another exemplary surgical fixation system 110. The surgical fixation system 110 of FIG. 8 is similar to the surgical fixation system 10 of FIG. 1. For example, the surgical fixation system 110 includes each of a fixation device 12, an adjustable loop 14, a continuous loop 16, a reinforcement material 18, and a passing filament 22. However, in this embodiment, the surgical fixation system 110 includes an additional shuttle construct 48. The shuttle construct 48 is separate from and in addition to the passing filament 22.

The shuttle construct 48 may be attached to the continuous loop 16 of the surgical fixation system 110 by swaging, knotting, or by any other fixation technique. The shuttle construct 48 may be constructed of any flexible, thread-like material or suture material. In an embodiment, the shuttle construct 48 is a suture strand. As discussed in greater detail below, the shuttle construct 48 aids in shuttling the continuous loop 16 of the surgical fixation system 110 through damaged tissue.

FIGS. 9-14, with continued reference to FIG. 8, schematically illustrate another exemplary method for repairing tissue. More particularly, FIGS. 9 through 14 illustrate, in sequential order, an exemplary embodiment for knotlessly repairing a native tissue 136 by employing the surgical fixation system 110. In an embodiment, the native tissue 136 is a completely torn native ACL. Complete tears may occur when both bundles of the native ACL are torn or otherwise damaged. However, this disclosure is not limited to complete repairs or to ACL repairs. The surgical fixation system 110 could be used in a variety of tissue repairs, including partial or complete tissue repairs, within the scope of this disclosure.

Fewer or additional steps than are recited below could be performed within the scope of this disclosure. In addition, the recited order of steps shown in FIGS. 9-14 is not intended to limit this disclosure.

Figure 9:
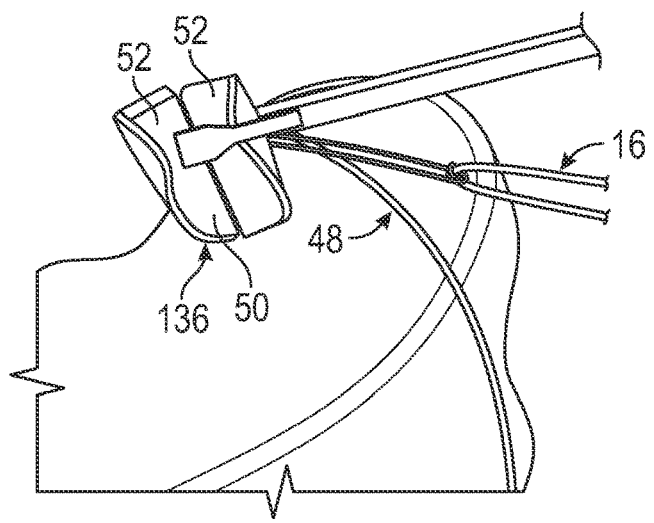
FIGS. 9, 10, 11, 12, 13, and 14 schematically illustrate a method for performing a knotless tissue repair using the surgical fixation system of FIG. 8.

Referring first to FIG. 9, the shuttle construct 48 of the surgical fixation system 110 may be passed through a stump 50 of the native tissue 136. The shuttle construct 48 may then be tensioned to shuttle the continuous loop 16 of the surgical fixation system 110 through the native tissue 136. The continuous loop 16 may be shuttled until the adjustable loop 14 is located immediately proximate the native tissue 136.

Figure 10:
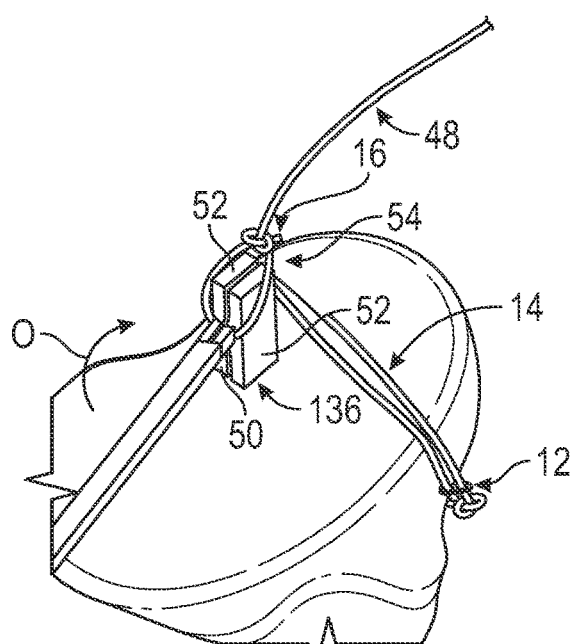

Next, as shown in FIG. 10, the continuous loop 16 may be rotated in a direction O to position the continuous loop 16 around both bundles 52 of the native tissue 136. In an embodiment, the direction O is toward an entry point 54 where the shuttle construct 48 originally enters the native tissue 136. The shuttle construct 48 may then be cut off of the surgical fixation system 110 using a cutting device 56 (see FIG. 11).

Figure 13:
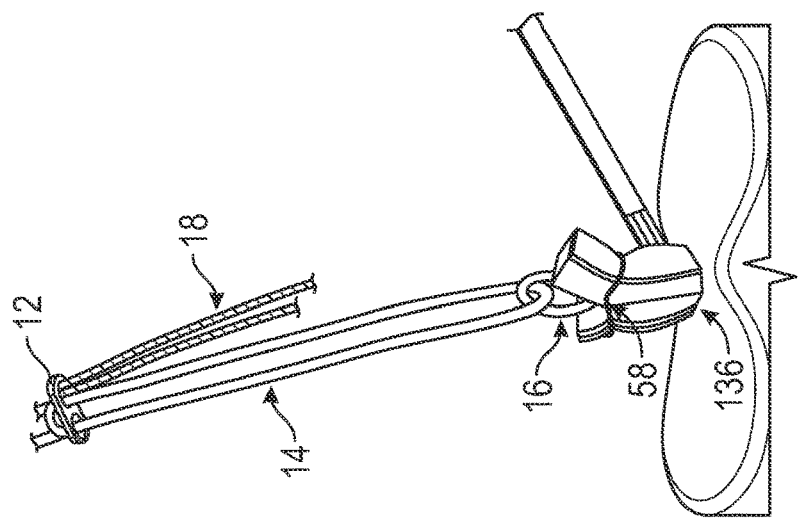
Figure 12:
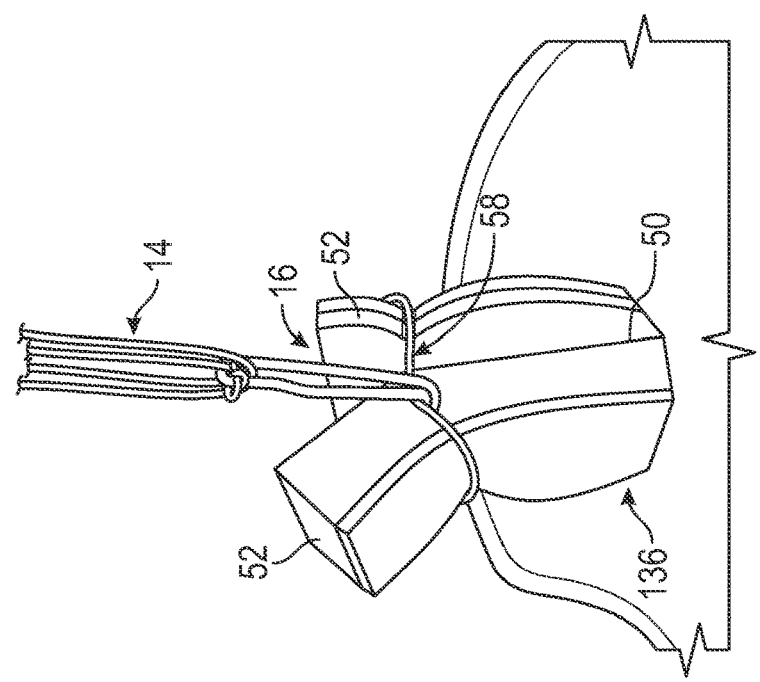
Figure 11:
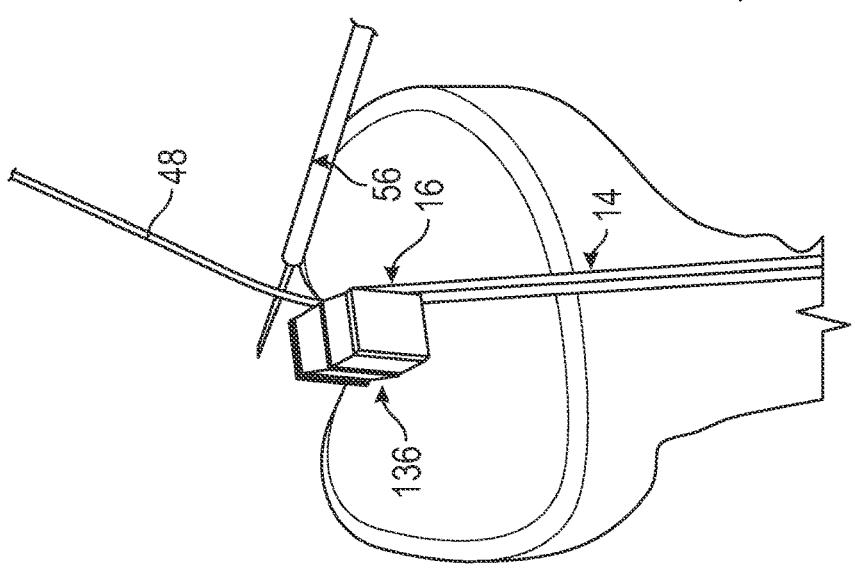

The backwards flipping/rotation of the continuous loop 16 in the manner shown in FIG. 10 creates a rip-stop cinched loop 58 in the surgical fixation system 110. The rip-stop cinched loop 58 is best illustrated in FIGS. 12 and 13. The rip-stop cinched loop 58 is configured to capture both bundles 52 of the native tissue 136, thereby providing improved fixation during the complete tissue repair.

Figure 14:
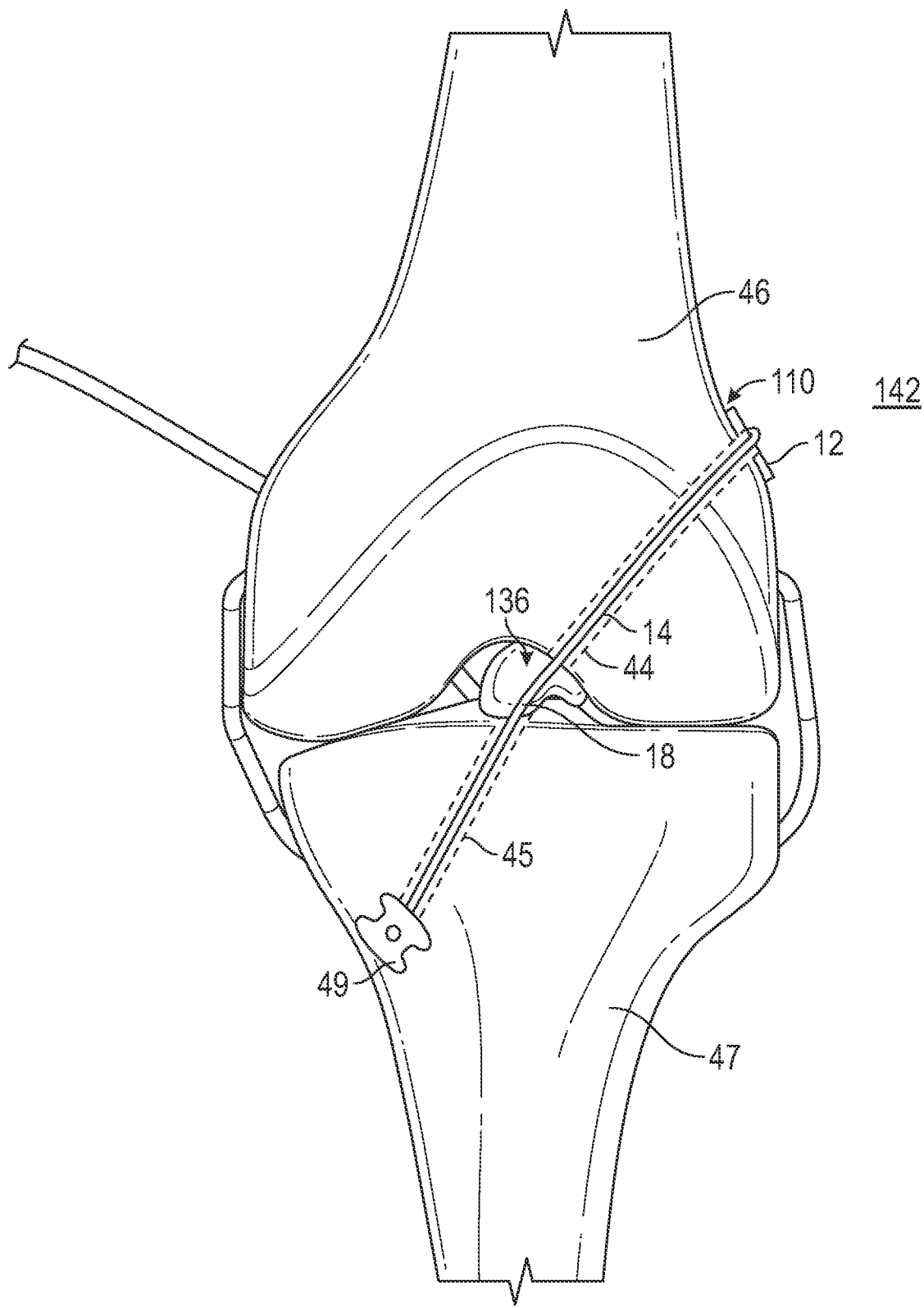

The surgical fixation system 110 may then be used to complete the tissue repair. FIG. 14 illustrates a final tissue repair 142 that is established by using the surgical fixation system 110. As shown, a bone tunnel 44 (e.g., a socket) may be formed in a bone 46 (e.g., a femur). The fixation device 12 may be passed through the bone tunnel 44 using the passing filament 22 and may self-flip onto the cortex of the bone 46 once tension is released on the passing filament 22. After passing and flipping the fixation device 12, the adjustable loop 14 is positioned within the bone tunnel 44. The free braid strands 24 may be pulled to adjust the size of the adjustable loop 14 and to aid the positioning of the adjustable loop 14 within the bone tunnel 44, thereby restoring the native tissue 136 to its native location and functionality.

If provided, the reinforcement material 18 of the surgical fixation system 110 can be utilized throughout the repair to optimize tension and to stabilize the construct. In an embodiment, the reinforcement material 18 may be passed through a second bone tunnel 45 of a second bone 47 (e.g., a tibia) and may then be fixated relative to the second bone 47 using a second fixation device 49 (e.g., a button or anchor).

Figure 15:
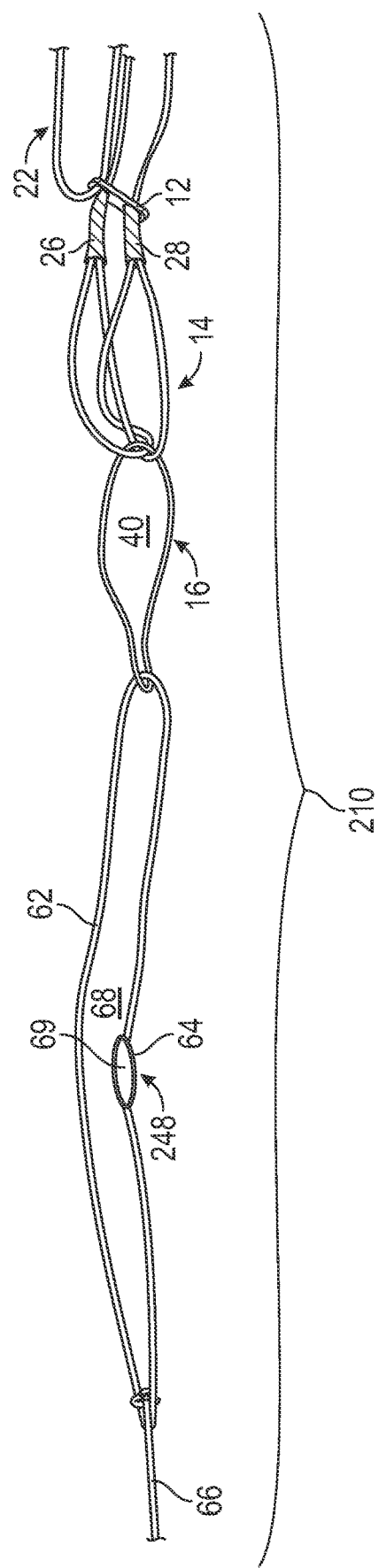
FIG. 15 illustrates a surgical fixation system for performing a knotless tissue repair method according to yet another embodiment of this disclosure.

FIG. 15 illustrates yet another exemplary surgical fixation system 210. The surgical fixation system 210 of FIG. 15 is similar to the surgical fixation systems 10, 110 of FIGS. 1 and 8, respectively. For example, the surgical fixation system 210 may include each of a fixation device 12, an adjustable loop 14, a continuous loop 16, and a passing filament 22. However, in this embodiment, the surgical fixation system 210 may include an additional shuttle construct 248. The shuttle construct 248 is separate from and in addition to the passing filament 22.

The shuttle construct 248 may be constructed from any flexible, thread-like material or suture material. As discussed in greater detail below, the shuttle construct 248 can be used to shuttle the continuous loop 16 of the surgical fixation system 210 through tissue.

In an embodiment, the shuttle construct 248 includes a suture loop 62, one or more suture pockets 64 formed in the suture loop 62, and a suture tail 66 that extends from the suture loop 62. The suture loop 62 of the shuttle construct 248 may be attached to the continuous loop 16 of the surgical fixation system 210 using any fixation technique. In an embodiment, a portion of the suture loop 62 is looped through the central opening 40 of the continuous loop 16. The suture loop 62 may establish an additional central opening 68 within the surgical fixation system 210. Each suture pocket 64 may be configured as an additional opening 69 formed in the suture loop 62 that is a separate opening from the central opening 68. The suture tail 66 may be located at an opposite end of the shuttle construct 248 from the portion of the suture loop 62 that is connected to the continuous loop 16.

FIGS. 16-20, with continued reference to FIG. 15, schematically illustrate an exemplary method for repairing tissue. More particularly, FIGS. 16 through 20 illustrate, in sequential order, an exemplary embodiment for knotlessly repairing a native tissue 236 by employing the surgical fixation system 210. In an embodiment, the native tissue 236 is a partially torn native ACL. However, the surgical fixation system 210 could be used in a variety of tissue repairs, including partial or complete tissue repairs, within the scope of this disclosure.

Fewer or additional steps than are recited below could be performed within the scope of this disclosure. In addition, the recited order of steps shown in FIGS. 16-20 is not intended to limit this disclosure.

Figure 16:
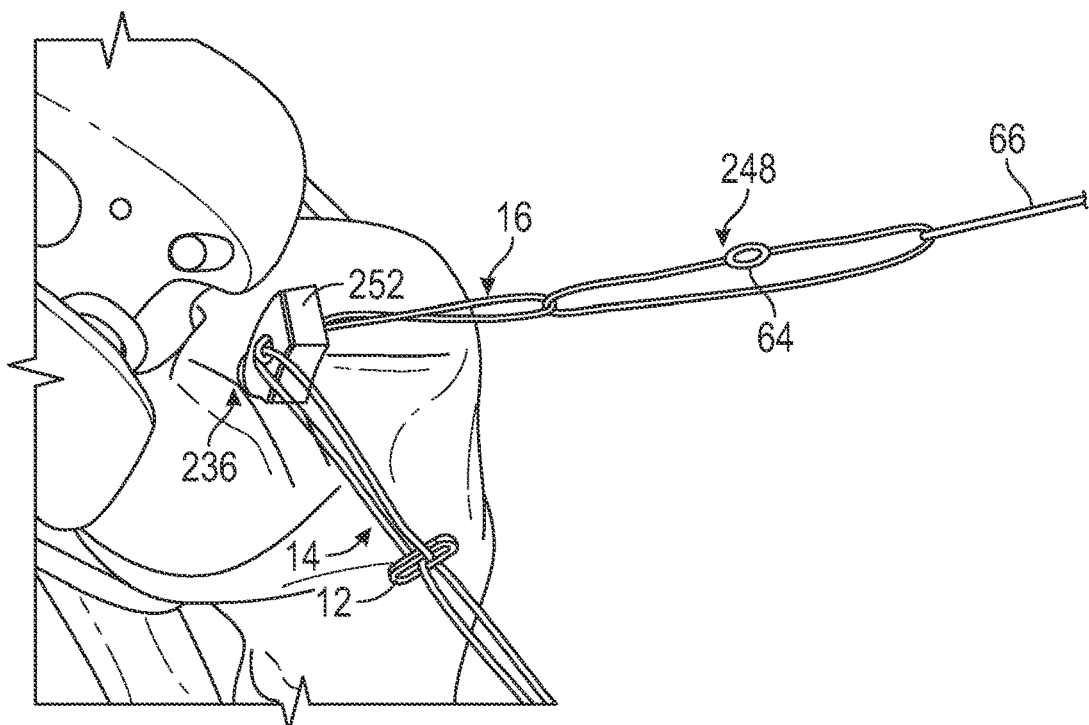
FIGS. 16, 17, 18, 19, and 20 schematically illustrate a method for performing a knotless tissue repair using the surgical fixation system of FIG. 15.

Referring first to FIG. 16, the shuttle construct 248 of the surgical fixation system 210 may be passed through a bundle 252 of the native tissue 236. The suture tail 66 of the shuttle construct 248 may then be tensioned to shuttle the continuous loop 16 of the surgical fixation system 210 through the native tissue 236. The continuous loop 16 may be shuttled until the adjustable loop 14 is located immediately proximate the native tissue 236.

Figure 17:
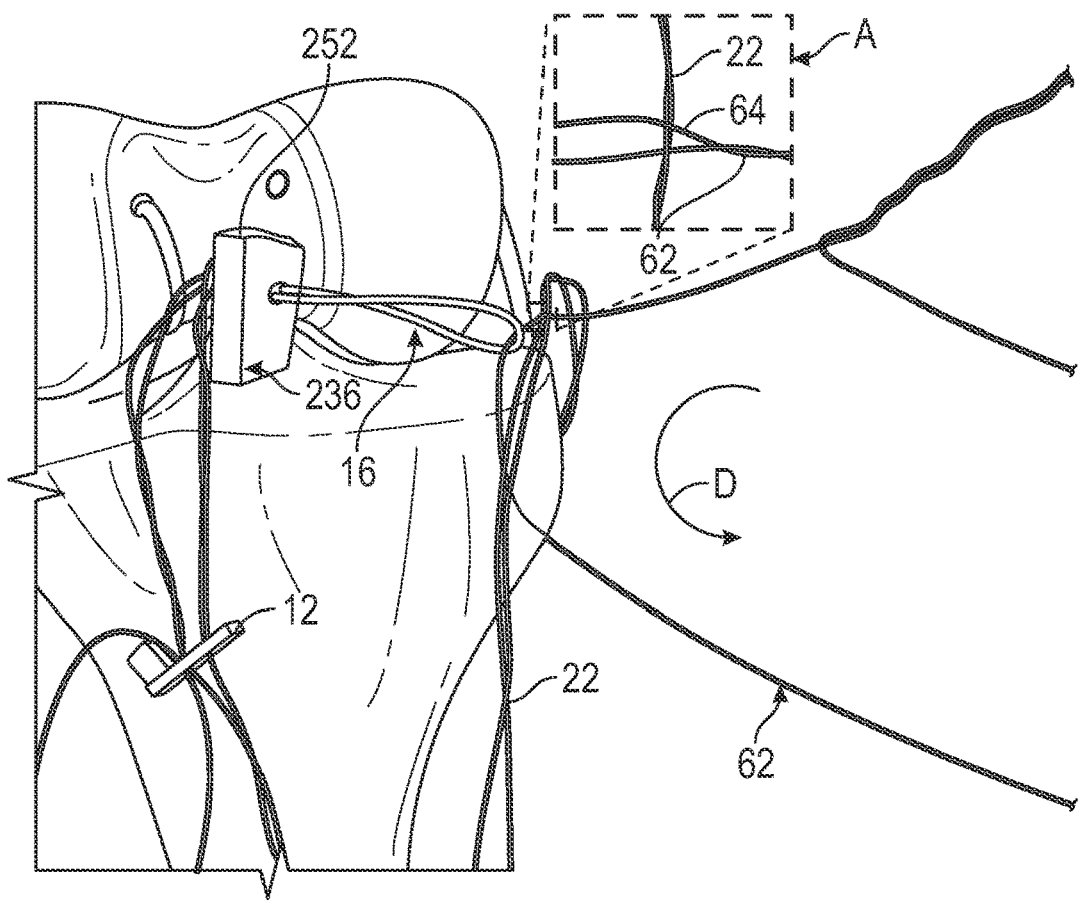
Figure 18:
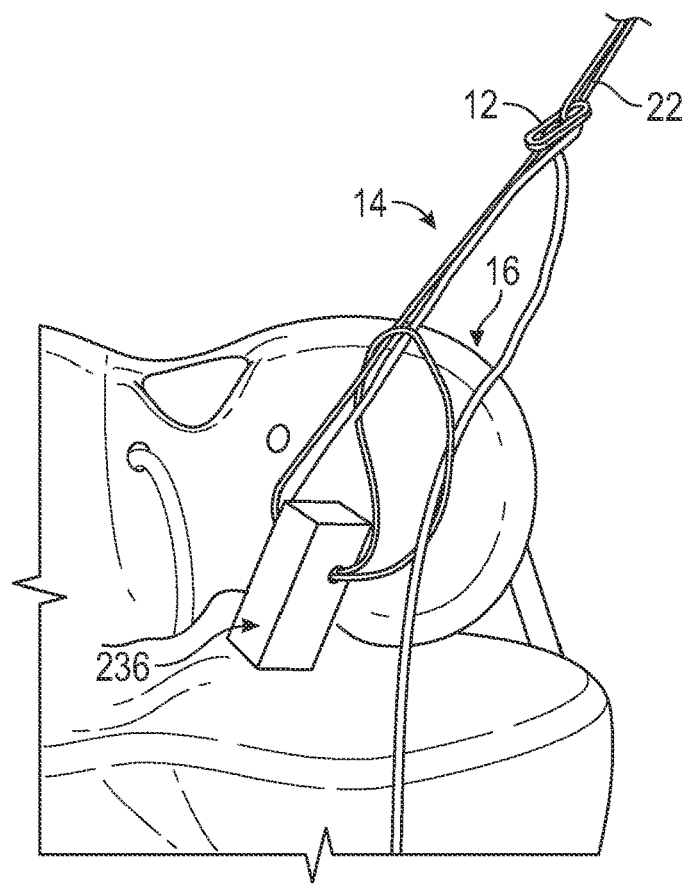
Figure 19:
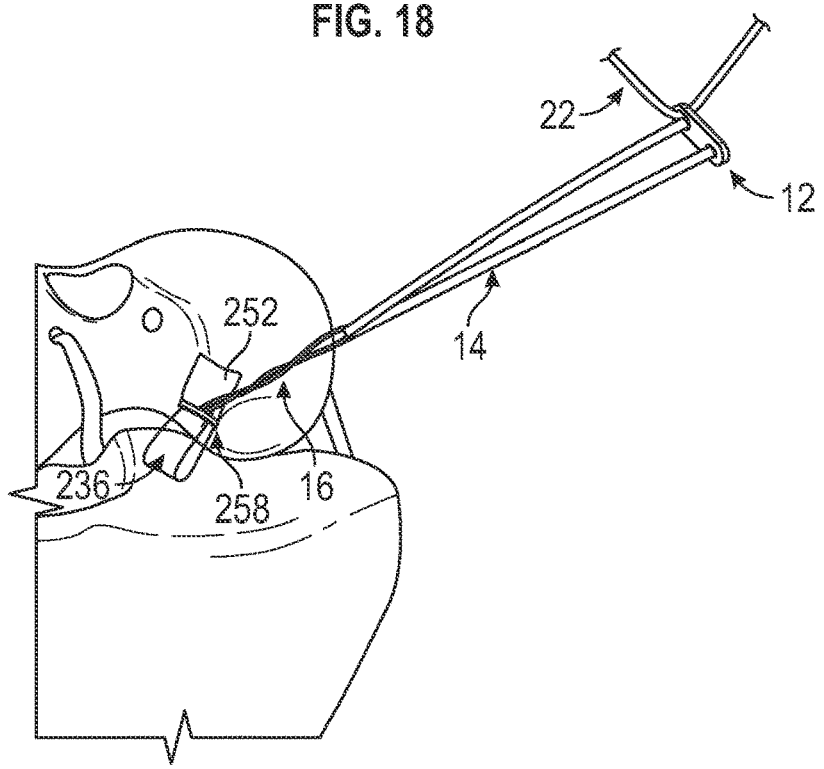

Next, as illustrated in FIG. 17, the passing filament 22 of the surgical fixation system 210 may be transferred through the continuous loop 16 by threading the passing filament 22 through the suture pocket 64 (see inset A) and simultaneously rotating the suture loop 62 in a direction D. The suture pockets 64 are configured as suture shuttling features that allow one to temporarily connect the passing filament 22 and the suture loop 62 to shuttle the passing filament 22 through the continuous loop 16 by rotating the suture loop 62. The transfer of the fixation device 12 through the continuous loop 16 (see FIG. 18) creates a cinched loop 258 around the bundle 252 of the native tissue 236 (see FIG. 19).

Figure 20:
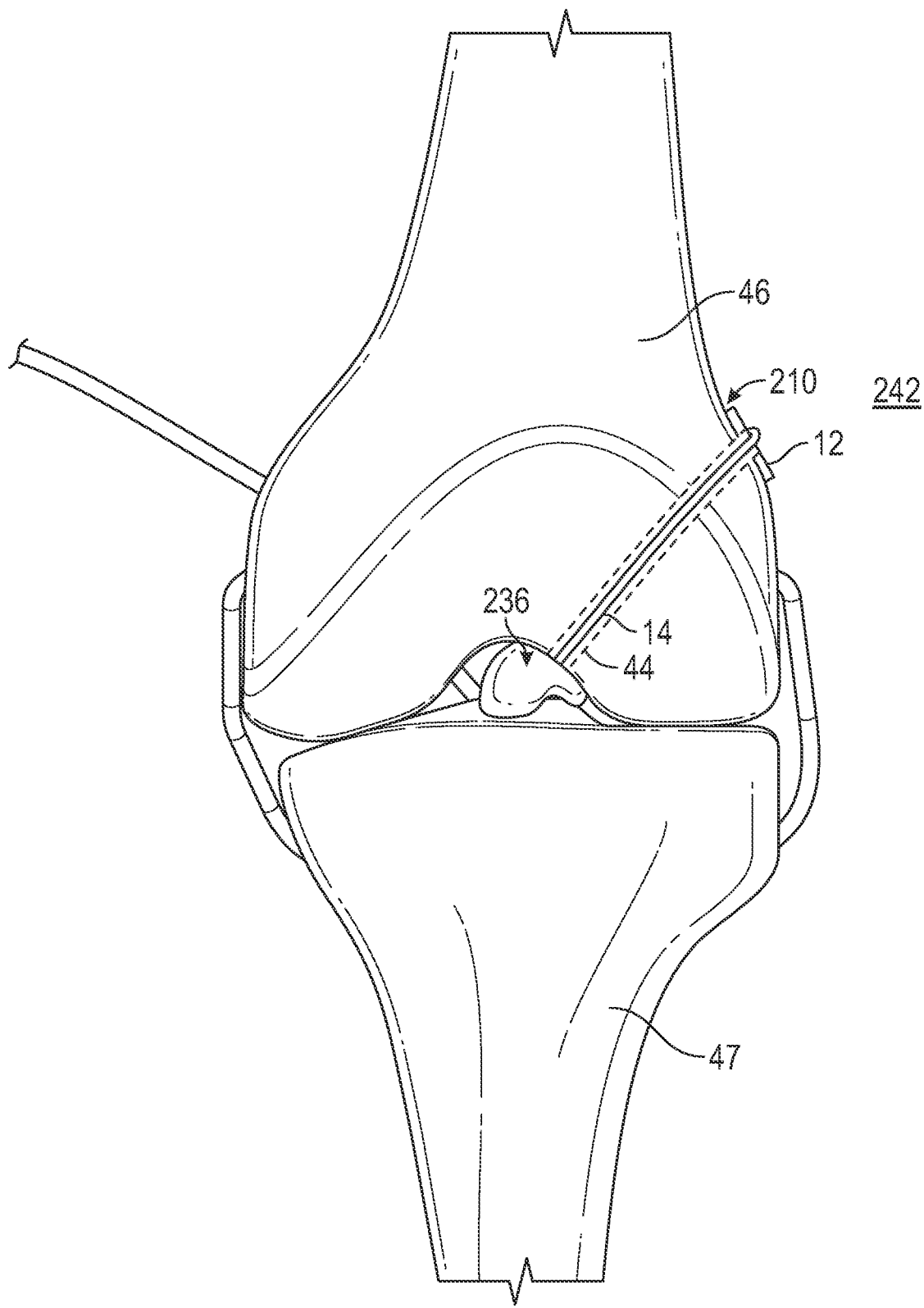

The surgical fixation system 210 may then be used to complete the tissue repair. FIG. 20 illustrates a final tissue repair 242 that can be achieved by using the surgical fixation system 210. As shown, a bone tunnel 44 (e.g., a socket) may be formed in a bone 46 (e.g., a femur). The fixation device 12 may be passed through the bone tunnel 44 and may self-flip onto the cortex of the bone 46 once tension is released. After passing and flipping the fixation device 12, the adjustable loop 14 is positioned within the bone tunnel 44. The free braid strands 24 may be pulled to adjust the size of the adjustable loop 14 and to aid the positioning of the adjustable loop 14 within the bone tunnel 44, thereby restoring the native tissue 236 to its native location and restoring functionality.

Figure 21:
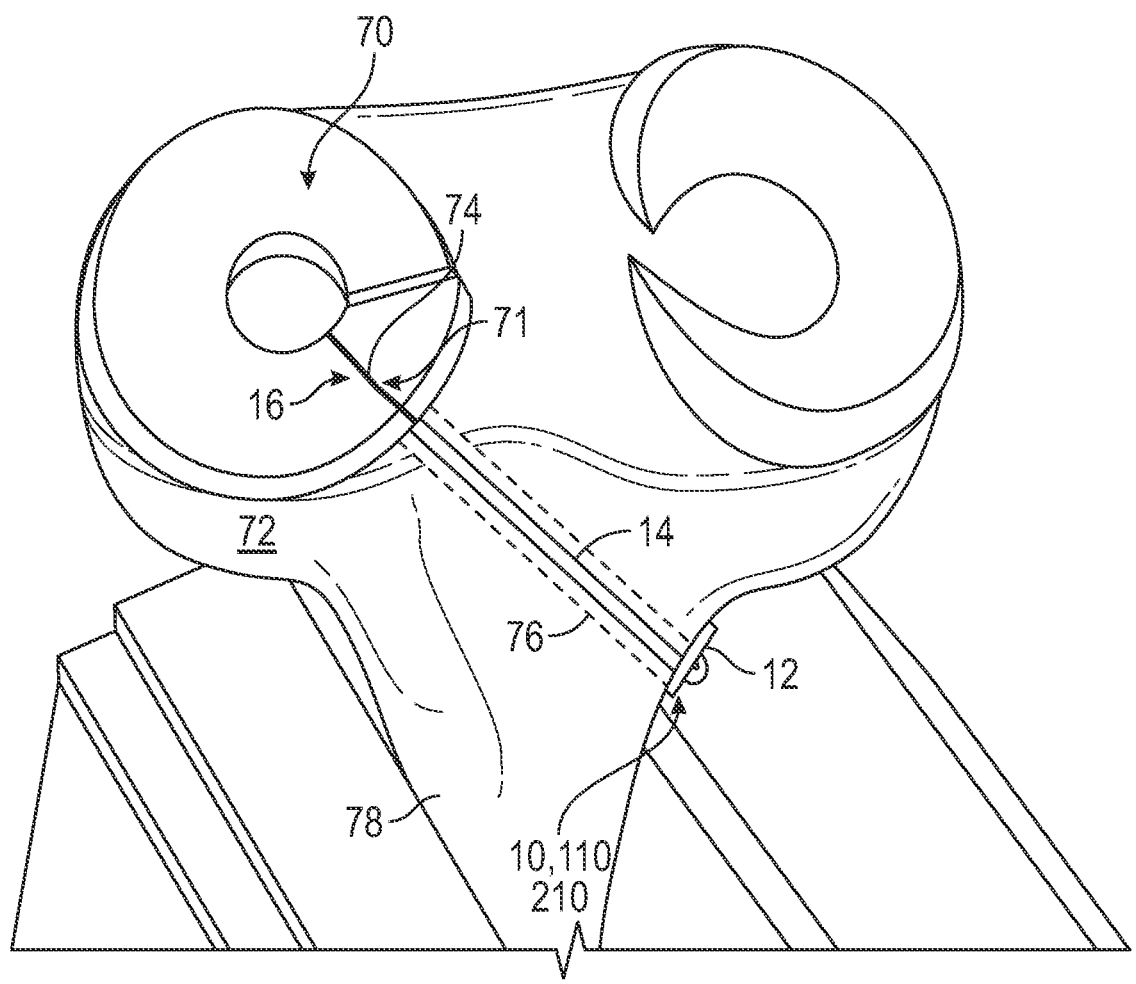
FIG. 21 schematically illustrates yet another method for performing a knotless tissue repair.

The surgical fixation systems 10, 110, 210 described above could be used to perform additional methods of repairing tissue. For example, as shown in FIG. 21, the surgical fixation systems 10, 110, 210 could be used to repair a native meniscus 70. The native meniscus 70 may include a tear 71 that requires repair.

FIG. 21 shows a final tissue repair 72 after repairing the native meniscus 70. The continuous loops 16 of the surgical fixation systems 10, 110, 210 may be utilized to create a cinched loop 74 around the native meniscus 70. The fixation device 12 of the surgical fixation systems 10, 110, 210 may then be passed through a bone tunnel 76 and may self-flip onto the cortex of a bone 78 (e.g., tibia). After passing and flipping the fixation device 12, the adjustable loop 14 of the surgical fixation system 10, 110, 210 is positioned within the bone tunnel 76. The free braid strands 24 may be pulled to adjust the size of the adjustable loop 14 and to aid the positioning of the adjustable loop 14 within the bone tunnel 76, thereby restoring the native meniscus 70 to its native location and restoring joint functionality.

Figure 22:
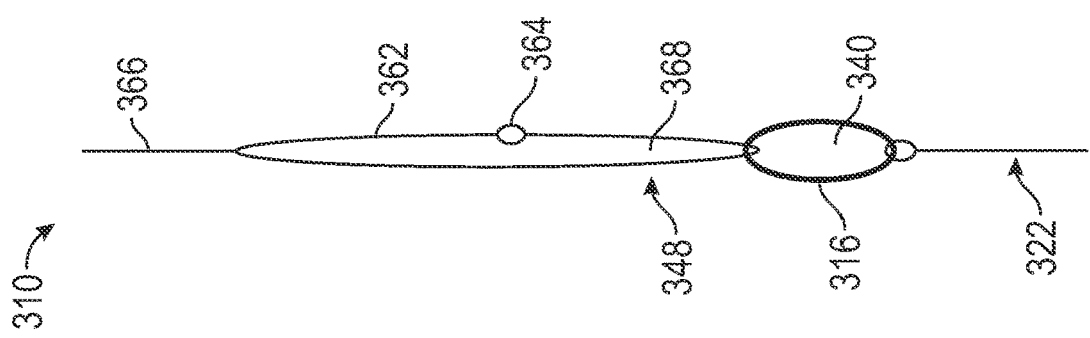
FIG. 22 illustrates a surgical fixation system for performing a knotless tissue repair method according to yet another embodiment of this disclosure.
Figure 23:
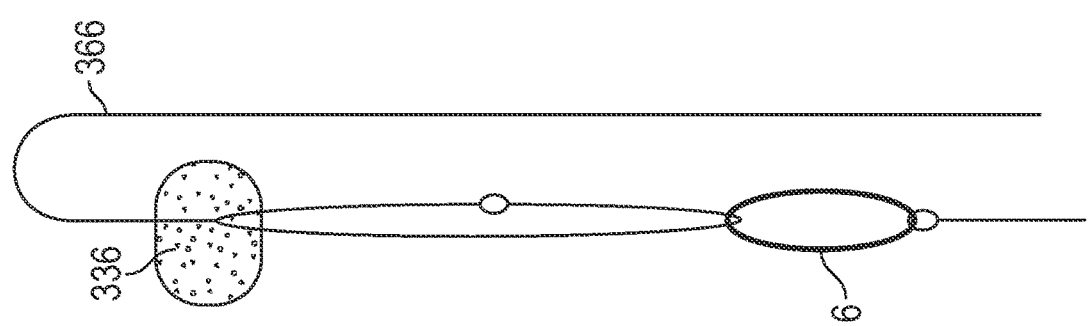
FIGS. 23, 24, 25, and 26 schematically illustrate a method for performing a knotless tissue repair using the surgical fixation system of FIG. 22.
Figure 24:
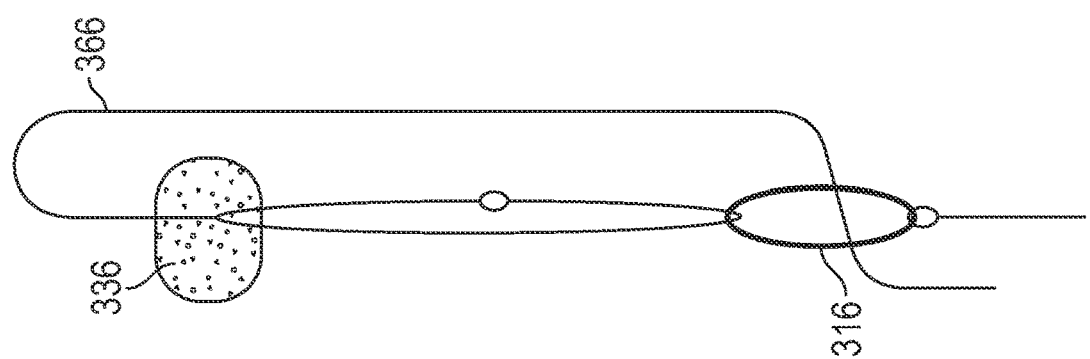
Figure 25:
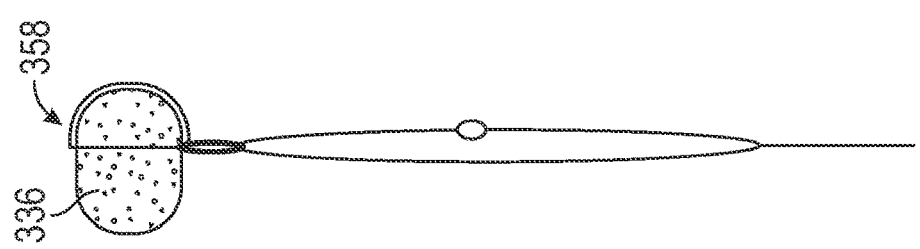

FIG. 22 illustrates yet another exemplary surgical fixation system 310. The surgical fixation system 310 of FIG. 22 is similar to the surgical fixation systems 10, 110, 210 described above. However, in this embodiment, the surgical fixation system 310 excludes the fixation device 12 and therefore relies only on flexible materials (e.g., sutures) for performing tissue repairs. Accordingly, in this embodiment, the surgical fixation system 310 is constructed entirely of flexible, thread-like materials.

The surgical fixation system 310 may include a continuous loop 316, a passing filament 322, and a shuttle construct 348. The passing filament 322 and the shuttle construct 348 may each be connected to the continuous loop 316.

In an embodiment, the shuttle construct 348 includes a suture loop 362, one or more suture pockets 364 formed in the suture loop 362, and a suture tail 366 that extends from the suture loop 362. The suture loop 362 of the shuttle construct 348 may be attached to the continuous loop 316 of the surgical fixation system 310 using any fixation technique. In an embodiment, a portion of the suture loop 362 is looped through a central opening 340 of the continuous loop 316. The suture loop 362 may establish an additional central opening 368 within the surgical fixation system 310. Each suture pocket 364 may be configured as an additional opening formed in the suture loop 362 that is a separate opening from the central opening 368. The suture tail 366 may be located at an opposite end of the shuttle construct 348 from the portion of the suture loop 362 that is connected to the continuous loop 316.

Referring now to FIGS. 23-26, the suture tail 366 may be shuttled through tissue 336 (see FIG. 23) and then through the continuous loop 316 (see FIG. 24) in order to form a cinched loop 358 (see FIG. 25) around the tissue 336.

Figure 26:
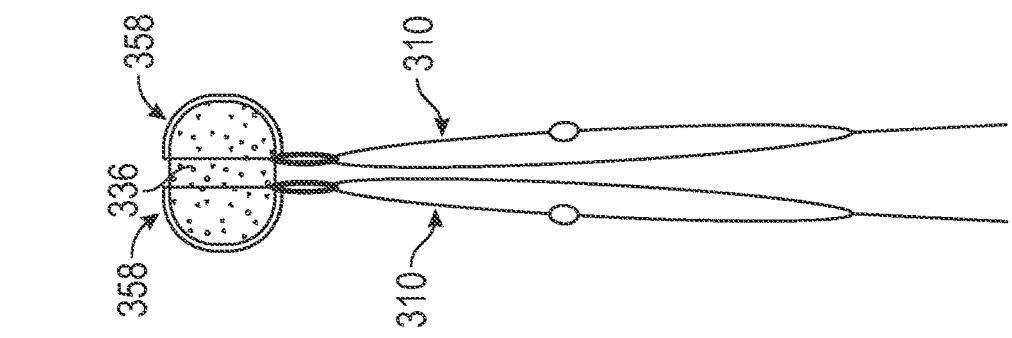

Multiple surgical fixation systems 310 could be used to create multiple cinched loops 358 around the tissue 336 (see, e.g., FIG. 26).

Figures 27, 28, 29:
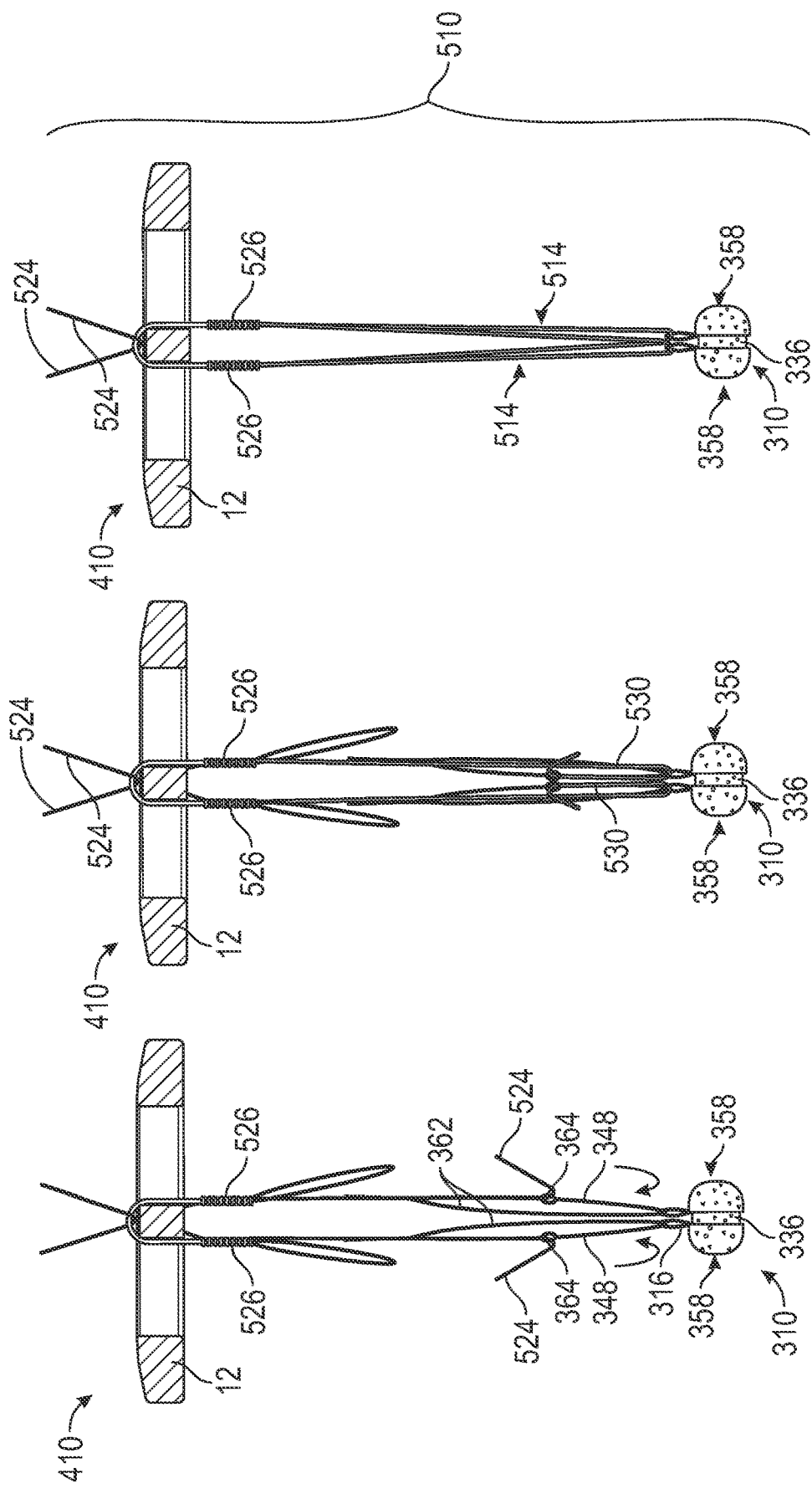
FIGS. 27, 28, and 29 schematically illustrate an exemplary use of the surgical fixation system of FIG. 22 in combination with another surgical fixation system to create a surgical fixation system having independent tensionable adjustable loops.

The surgical fixation system 310 of FIG. 22 could be utilized in combination with another surgical fixation system 410 to create a surgical fixation system 510 having independent tensionable adjustable loops 514. This combined configuration is shown in FIGS. 27-29. At least one free braid strand 524 for adjusting an adjustable eyesplice loop 530 to create an adjustable loop 514 of the surgical fixation system 510 may be transferred through the continuous loop 316 by threading the free braid strand 524 through the suture pocket 364 and simultaneously rotating the suture loop 362. The free braid strand 524 may then be transferred through a locking mechanism 526 of the surgical fixation system 510 to create the independent tensionable adjustable loops 514 (final construct shown in FIG. 29).

The surgical fixation systems of this disclosure provide knotless, adjustable suture loop-based arthroscopic soft tissue repair devices and associated methods for repairing tissue. After primary fixation and preloading of the tissue repair, the surgical fixation systems of this disclosure may allow for re-tensioning to be performed to avoid gap formation and to improve the fixation strength of the repair filaments.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A surgical fixation system, comprising:
a fixation device;
a passing filament connected to the fixation device;
an adjustable loop connected to the fixation device;
a continuous loop connected to the adjustable loop; and
a shuttle construct connected to the continuous loop,
wherein the shuttle construct includes a suture loop, a suture pocket formed in the suture loop, and a suture tail that extends from the suture loop,
wherein the suture loop establishes a central opening, and the suture pocket establishes an opening that is separate from the central opening,
wherein the passing filament is received through the opening of the suture pocket to temporarily connect the passing filament to the suture loop,
wherein the passing filament and the fixation device are received through the continuous loop to create a cinched loop.

2. The surgical fixation system as recited in claim 1, wherein the fixation device is a button or an anchor.

3. The surgical fixation system as recited in claim 1, wherein the adjustable loop includes a first adjustable eyesplice loop received through a first aperture of the fixation device and a second adjustable eyesplice loop received through a second aperture of the fixation device.

4. The surgical fixation system as recited in claim 3, wherein the adjustable loop includes a first free braid strand for adjusting the first adjustable eyesplice loop and a second free braid strand for adjusting the second adjustable eyesplice loop.

5. The surgical fixation system as recited in claim 4, wherein the first free braid strand extends from a first spliced section of the adjustable loop and the second free braid strand extends from a second spliced section of the adjustable loop.

6. The surgical fixation system as recited in claim 1, wherein the continuous loop is a non-adjustable loop.

7. The surgical fixation system as recited in claim 1, wherein a portion of the continuous loop rests over top of an interconnection between a first adjustable eyesplice loop and a second adjustable eyesplice loop of the adjustable loop.

8. The surgical fixation system as recited in claim 1, wherein a first portion of the suture loop is attached to the continuous loop and the suture tail is connected to a second portion of the suture loop that is located at an opposite end of the suture loop from the first portion.

9. The surgical fixation system as recited in claim 1, comprising a reinforcement material connected to the fixation device and being unattached to both the adjustable loop and the continuous loop, wherein the reinforcement material is tensionable separately from both the adjustable loop and the continuous loop, wherein the reinforcement material includes a suture tape that is looped through apertures of the fixation device.

10. The surgical fixation system as recited in claim 9, wherein the reinforcement material and the adjustable loop are both received through a first aperture and a second aperture of the apertures of the fixation device.

11. The surgical fixation system as recited in claim 1, wherein the passing filament is unconnected to any portion of the adjustable loop.

12. The surgical fixation system as recited in claim 1, wherein the continuous loop is looped over the adjustable loop and includes knotted-together ends to attach the continuous loop to the adjustable loop.

13. The surgical fixation system as recited in claim 12, wherein the continuous loop is looped over a portion of the adjustable loop that is located at an opposite end of the adjustable loop from that which is connected to the fixation device.

14. The surgical fixation system as recited in claim 1, wherein the suture pocket is a continuous loop formed in the suture loop of the shuttle construct.

* * * * *